July 30, 1940.  E. C. ZABLOCKI  2,209,371
MACHINE FOR APPLYING CORD TO TRIM PANELS
Filed Sept. 20, 1937   2 Sheets-Sheet 1
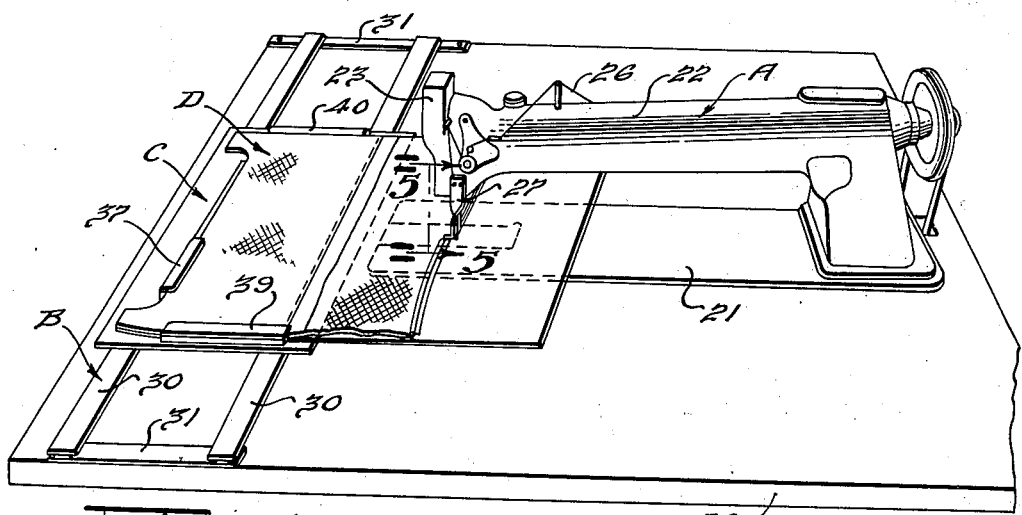
FIG. 1.
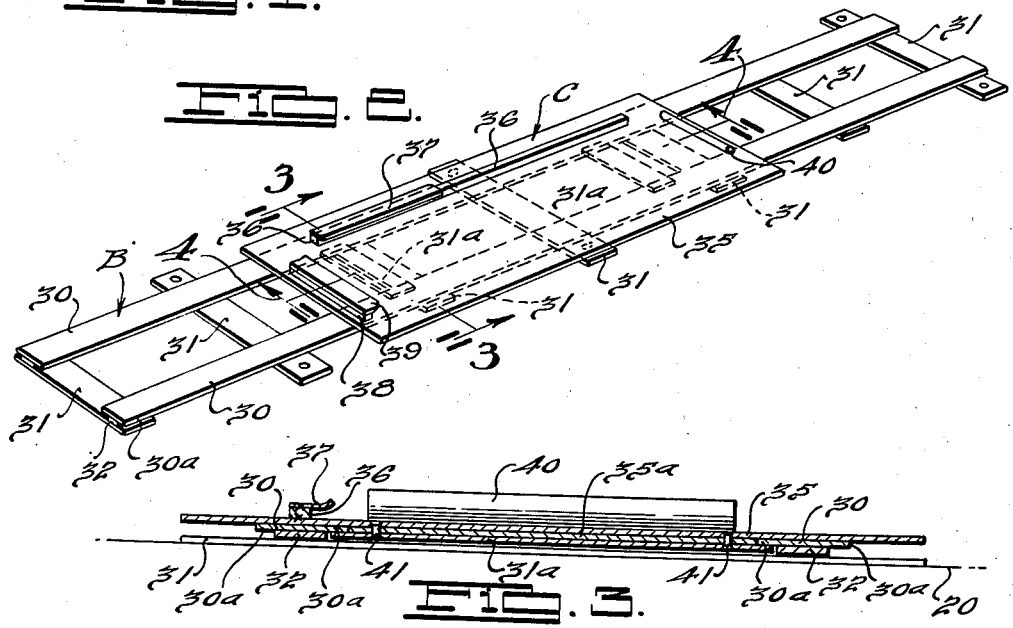
FIG. 2.
FIG. 3.
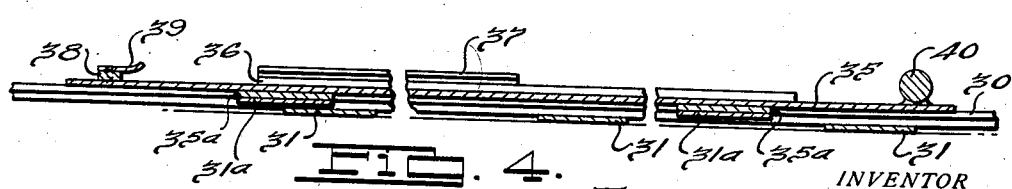
FIG. 4.
INVENTOR
Eugene C. Zablocki.
BY Dike, Calver & Gray
ATTORNEYS.

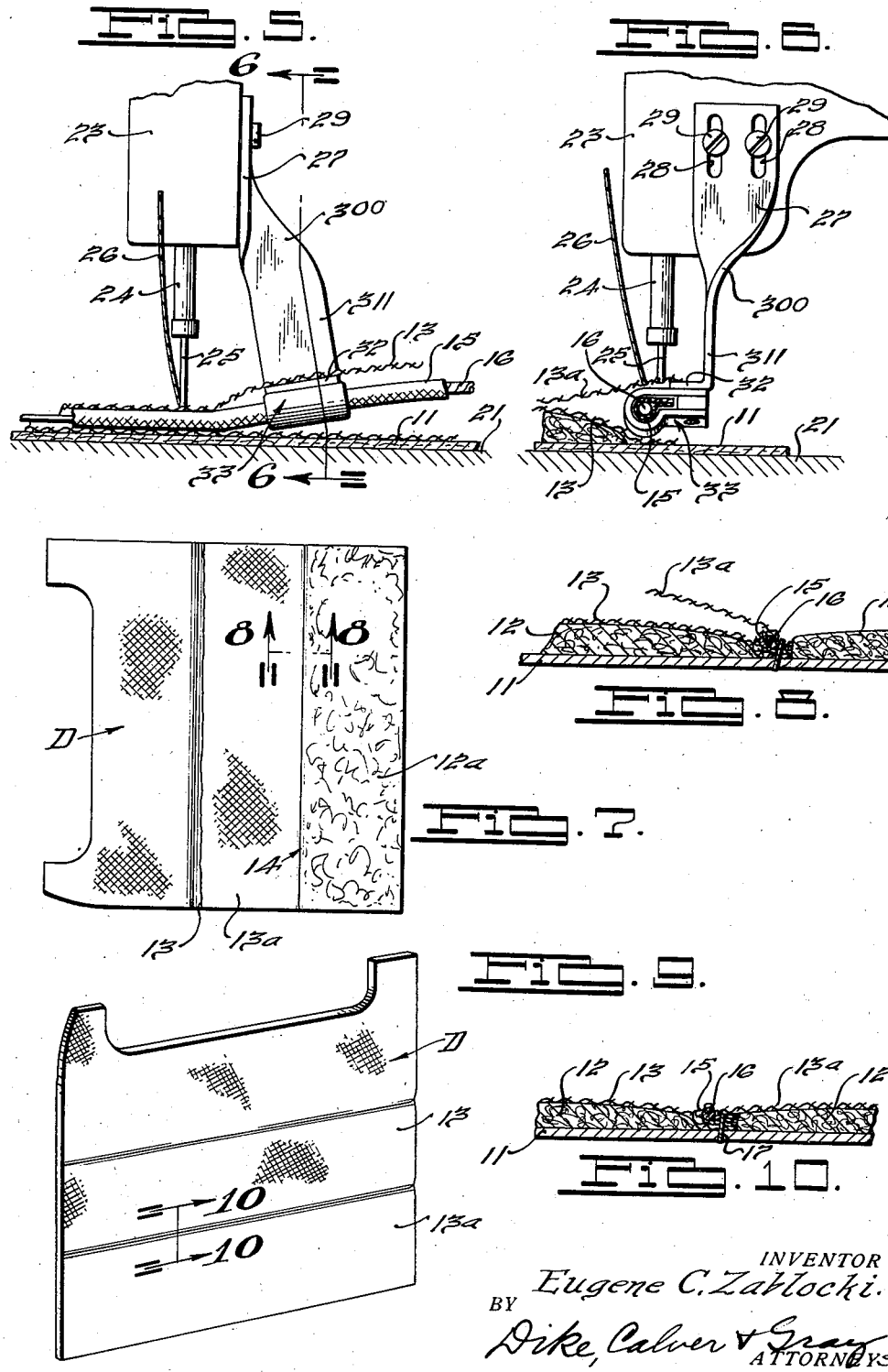

Patented July 30, 1940

2,209,371

UNITED STATES PATENT OFFICE 2,209,371

MACHINE FOR APPLYING CORD TO TRIM PANELS

Eugene C. Zablocki, Detroit, Mich., assignor to Briggs Manufacturing Company, Detroit, Mich., a corporation of Michigan Application September 20, 1937, Serial No. 164,629

4 Claims. (Cl. 112—2)

This invention relates to an upholstery machine and method and more particularly to a machine and method for applying cord or welt to upholstery material, such as trim panels, seat and/or back cushion covers, and the like.

An object of the invention is to provide a machine of the foregoing character having sewing mechanism for attaching cord and/or welt to the cover material and also having means for supporting and guiding the work through the machine.

Another object of the invention is to provide a machine having a movable work supporting member or platen and guide means therefor in which the support is detachable and interchangeable with other work supports of various sizes to accommodate work pieces, such as trim panels, of varying sizes and shapes, and one in which the work support or member is guided in a predetermined path adjacent the sewing mechanism.

A further object of the invention is to provide a machine of the foregoing character having work supporting members to which the work pieces may be quickly applied and removed.

Another object of the invention is to provide a machine having adjustable supporting and guiding means for the cord and/or welt.

The above and other objects of the invention will appear from the following description and appended claims when considered in connection with the accompanying drawings forming a part of this specification, wherein like reference characters designate corresponding parts in the several views.

In said drawings:

Fig. 1 is a perspective view of a machine illustrating one embodiment of the present invention.

Fig. 2 is a perspective view on an enlarged scale, showing the work support or platen and guide or trackway therefor of Fig. 1, removed from the bed of the machine.

Fig. 3 is a transverse section, on an enlarged scale, taken substantially along the line 3—3 of Fig. 2, looking in the direction of the arrows.

Fig. 4 is a longitudinal sectional view, on an enlarged scale, taken substantially along the line 4—4 of Fig. 2, looking in the direction of the arrows.

Fig. 5 is a fragmentary elevational view, partly in section, on an enlarged scale, taken substantially along the line 5—5 of Fig. 1, looking in the direction of the arrows.

Fig. 6 is a fragmentary elevational view, partly in section, taken substantially along the line 6—6 of Fig. 5, looking in the direction of the arrows.

Fig. 7 is a top plan view of a trim panel embodying the invention and illustrating one step in the method of making the same in accordance with the invention.

Fig. 8 is a fragmentary transverse section, on an enlarged scale, taken substantially along the line 8—8 of Fig. 7, looking in the direction of the arrows.

Fig. 9 is a perspective view of the trim panel of Fig. 7 and showing the panel after it has issued from the sewing mechanism of the machine embodying the present invention; and Fig. 10 is a fragmentary transverse section, on an enlarged scale, taken substantially along the line 10—10 of Fig. 9, looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring particularly to Fig. 1, there is shown, merely by way of example, a machine embodying the present invention. As shown, the machine comprises a table or bed 20 having mounted thereupon a sewing machine shown as a whole at A, the machine being of the so-called bracket arm type and comprising a metal base 21, an overhanging arm 22, and a head 23. The machine is preferably power operated as by means of an electric motor (not shown) and is provided with conventional thread guides and thread feeding devices. As seen in Figs. 5 and 6, the head 23 carries a needle bar guide (not shown) which supports a vertically reciprocating needle bar 24 carrying a needle 25 to which thread 26 is supplied in the usual manner.

The machine is provided with a cord and/or welt supporting and guiding device which, as shown, comprises a base plate 27 provided with slots 28 through which screws 29 pass to adjustably support the device upon the front face of the machine head 23. The base plate 27 is extended downwardly and twisted at 300 to provide a substantially right angularly disposed depending portion 311 having a flange 32 for supporting the cord and welt guide member per se which is shown as a whole at 33. The purpose and operation of the cord and welt guide and support will be explained hereinafter.

As shown in Fig. 1 the left side of the table or bed 20 is provided with a transversely disposed guide or trackway shown as a whole at B for supporting and guiding a work supporting member or platen which is shown as a whole at C. As shown, the guide or trackway B comprises a pair of flat metal rails 30 mounted upon a plurality of transversely disposed spaced metal supporting plates 31. As shown, certain of these supporting plates 31 are longer than others and the longer ones are secured to the bed of the machine and serve to support the parallel track members 30 adjacent the head of the sewing machine A. Referring particularly to Figs. 2, 3 and 4, the rails 30 of the trackway or guide device are spaced above the transverse supports 31 by means of strips 32 which extend throughout the length of the rails and are narrower than said rails so that each rail 30 has an overhanging portion 30a at opposite longitudinal sides of the members 32. If desired, the members 30, 31 and 32 may be formed of wood or other suitable material.

The work piece support or platen C, as shown, comprises a substantially rectangular metal base or plate 35 provided on its top face adjacent one longitudinal edge thereof with a metal work locating strip or piece 36 carrying adjacent one of its ends a metal guide piece 37. As shown in Fig. 3 the metal guide is flared upwardly at its inner longitudinal edge. The members 36 and 37 are secured together and to the metal plate 35 in any suitable manner, as by spot welding. Adjacent one of its ends, the plate 35 is provided with a pair of metal locating members or strips 38 and 39 similar to the parts 36 and 37. These members 38 and 39 are preferably welded together and to the top face of the plate 35. At the opposite end of the plate there is provided a transverse substantially round metal bar 40 which may be secured to the top face of the plate in any suitable manner, as by rivets, bolts or welding. If desired, this bar 40 may be formed of wood or other suitable material. The purpose of the members 37, 39 and 40 is to receive and support three side edges of the work such, for example, as the trim panel D shown in Figs. 1, 7 and 9. The work, in the case of the trim panel D, is applied to the work support or platen C by first engaging two angularly disposed edges of the panel with the guide pieces or locating members 36—37 and 38—39, flexing the panel and bringing a third edge thereof into contact with the bar 40. The latter edge of the panel has a wedging engagement with the bar 40 thus serving to hold the panel firmly upon the support. It will be understood that the work engaging members 37, 39 and 40 may be varied in construction and position upon the supporting plate 35 in accordance with the shape, size and character of the particular work pieces which are to be run through the machine.

As stated above the trackway or guide B is mounted upon the bed 20 of the machine. The work support or platen C is detachably and slidably engaged with the trackway and has on its underface a pair of spacer members 35a which are secured to the plate 35 and interposed between its underface and the transverse supports 31a. The members 31a and 35a are secured to the plate 35 in any suitable manner, as by means of rivets 41, see Fig. 3. As seen in this figure the outer ends of the spacers 35a slidingly engage the inner edges of the track members 30 and the outer ends of the transverse members 31a underlie the edges of said track members. Thus the work support C, when engaged with the track members 30, can be slid longitudinally along the trackway B. If it is desired to use a work support or platen of different type or shape, the work support C can be removed from the trackway and the new support applied thereto.

As shown, the work piece D is a trim panel which comprises a foundation sheet 11, strips or sections of batting or padding 12 and a series of pieces of cover material 13. It is desirable to apply to the trim panel, to give to said panel the effect and appearance of parallel tufts and spaced seams, a plurality of spaced binding cords or welts which are located at predetermined points throughout the width of the panel. As illustrated in the drawings, the machine is forming a seam at the point indicated by the numeral 14, Fig. 7. A piece of welt shown as a whole at 15 and a cord 16 are fed into the guide portion or throat 33 of the cord and welt supporting and guiding device. In practice, the free or unsecured inner end or edge of the fabric cover strip 13 passes beneath the guide 33, see Fig. 6, and the unsecured cover piece 13a, with its face side down, has its adjacent edge overlying the guide 33 and engaging the guide flange 32. The guide 33 is located in advance of the needle 25 so that the several parts of the trim panel with the cord and welt will be stitched together by the thread 17, Figs. 8 and 10. This single thread stitches together the free edges of the cover pieces 13a and 13 and the edges of the welt 15 which encloses and conceals the cord 16 and secures these pieces to the padding 12 and 12a and the foundation sheet 11. As the trim panel issues from the stitching mechanism the parts are in substantially the positions in which they are shown in Fig. 8. The thread is now severed and the cover piece 13a laid down over the uncovered padding or batting section 12a, as shown in Fig. 10. The unsecured edges of the fabric piece 13a may be attached to the trim panel in any suitable manner, as by cementing to the back face of the sheet 11.

By providing a welt and cord guide which is vertically adjustable relative to the machine head, panels and other work pieces of various thicknesses may be run through the machine.

From the foregoing it will be seen that I have evolved an upholstery machine and a method for applying cord to trim panels and the like for purposes of ornamentation and to give to said trim panel the appearance of seamed tufting. I have also provided means whereby the work is guided accurately through the machine so that manual guiding is unnecessary and thereby eliminated.

I claim:

1. An upholstery machine for applying finish cord to a trim panel or the like, comprising a bed, sewing mechanism mounted upon the bed, a trackway on the bed extending from one side to the opposite side thereof, said trackway having spaced longitudinal members and transverse connecting members for attaching the trackway to said bed, means for guiding the cord to said sewing mechanism, a work support mounted upon and movable along said trackway for carrying the panel to said sewing mechanism, said work support having transverse spacer members slidingly engaging the inner edges of the longitudinal members of the trackway and transverse supporting members having their outer ends underlying the said inner edges of the longitudinal members of said trackway, said sewing mechanism having means for attaching said cord to said trim panel, and panel positioning means carried by the work support for releasably gripping a plurality of edges of the panel.

2. An upholstery machine for applying finish cord to a trim panel or the like, comprising a bed, sewing mechanism mounted upon the bed, a trackway on the bed extending from one side to the opposite side thereof, said trackway having spaced longitudinal members and transverse connecting members for attaching the trackway to said bed, means for guiding the cord to said sewing mechanism, a work support mounted upon and movable along said trackway for carrying the panel to said sewing mechanism, said work support having transverse supporting members on its underside having their outer ends underlying the inner edges of the longitudinal members of said trackway, said sewing mechanism having means for attaching said cord to said trim panel, and spaced panel locating means carried by the top side of the work support for releasably gripping a plurality of edges of the panel whereby to prevent its displacement with respect to the work support during the movement thereof through the machine.

3. An upholstery machine for applying finish cord to a trim panel or the like, comprising a bed, sewing mechanism mounted upon the bed, a trackway on the bed extending from one side to the opposite side thereof, said trackway having spaced longitudinal members and transverse connecting members for attaching the trackway to said bed, means for guiding the cord to said sewing mechanism, a work support mounted upon and movable along said trackway for carrying the panel to said sewing mechanism, said work support having transverse spacer members slidingly engaging the inner edges of the longitudinal members of the trackway and transverse supporting members having their outer ends underlying the said inner edges of the longitudinal members of said trackway, said sewing mechanism having means for attaching said cord to said trim panel, and panel positioning means carried by the work support for releasably gripping a plurality of edges of the panel, said work support being removable from said trackway thereby permitting the interchangeability of the work supports.

4. An upholstery machine for applying finish cord to a trim panel or the like, comprising a bed, sewing mechanism mounted upon the bed, a trackway on the bed extending from one side to the opposite side thereof, said trackway having spaced longitudinal members and transverse connecting members for attaching the trackway to said bed, means for guiding the cord to said sewing mechanism, a work support mounted upon and movable along said trackway for carrying the panel to said sewing mechanism, said work support having transverse supporting members on its underside having their outer ends underlying the inner edges of the longitudinal members of said trackway, said sewing mechanism having means for attaching said cord to said trim panel, and spaced panel locating means carried by the top side of the work support for releasably gripping a plurality of edges of the panel whereby to prevent its displacement with respect to the work support during the movement thereof through the machine, said panel locating means comprising a fixed strip having a guide attached thereto provided with an upwardly flared free edge portion positioned adjacent one longitudinal edge of the work support, a second fixed strip having a guide provided with an upwardly flared free edge portion positioned adjacent one transverse edge of the work support and a fixed substantially round bar positioned adjacent the opposite transverse edge of said work support.

EUGENE C. ZABLOCKI.